United States Patent
Eastlack

(10) Patent No.: US 9,104,416 B2
(45) Date of Patent: Aug. 11, 2015

(54) AUTONOMOUS MICROPROCESSOR RE-CONFIGURABILITY VIA POWER GATING PIPELINED EXECUTION UNITS USING DYNAMIC PROFILING

(71) Applicant: Jeffrey R. Eastlack, Austin, TX (US)

(72) Inventor: Jeffrey R. Eastlack, Austin, TX (US)

( * ) Notice: Subject to any disclaimer, the term of this patent is extended or adjusted under 35 U.S.C. 154(b) by 342 days.

(21) Appl. No.: 13/759,067

(22) Filed: Feb. 5, 2013

(65) Prior Publication Data

US 2013/0205150 A1 Aug. 8, 2013

Related U.S. Application Data

(60) Provisional application No. 61/595,143, filed on Feb. 5, 2012.

(51) Int. Cl.
*G06F 1/32* (2006.01)

(52) U.S. Cl.
CPC .............. *G06F 1/324* (2013.01); *G06F 1/3287* (2013.01); *Y02B 60/1282* (2013.01)

(58) Field of Classification Search
CPC ...... G06F 1/3203; G06F 1/324; G06F 1/3287
USPC ........... 713/321, 300, 600; 717/130; 712/219; 709/220; 348/340
See application file for complete search history.

(56) References Cited

U.S. PATENT DOCUMENTS

| | | | |
|---|---|---|---|
| 5,719,800 A * | 2/1998 | Mittal et al. ................... | 713/321 |
| 5,987,620 A * | 11/1999 | Tran .............................. | 713/600 |
| 7,266,707 B2 | 9/2007 | Ngo et al. | |
| 7,447,923 B2 | 11/2008 | Bose et al. | |
| 7,490,302 B1 | 2/2009 | Rahman et al. | |
| 7,868,479 B2 | 1/2011 | Subramaniam | |
| 8,219,834 B2 * | 7/2012 | Basak et al. .................. | 713/300 |
| 2006/0224864 A1 * | 10/2006 | DeMent et al. ................ | 712/219 |
| 2006/0285004 A1 * | 12/2006 | Suemoto ....................... | 348/340 |
| 2007/0079294 A1 * | 4/2007 | Knight et al. ................. | 717/130 |
| 2011/0231524 A1 * | 9/2011 | Lin et al. ....................... | 709/220 |
| 2012/0254633 A1 * | 10/2012 | Vilhauer et al. .............. | 713/300 |

* cited by examiner

*Primary Examiner* — Thomas Lee
*Assistant Examiner* — Aurel Prifti
(74) *Attorney, Agent, or Firm* — Andrew Alia

(57) ABSTRACT

In an embodiment, a functional unit control method includes, using a performance monitoring unit connected to a processor, collecting performance data of a first type of functional unit in an execution stage of the processor for each process running on a time multiplexed computing system running a multitasking operating system. The method further includes determining a utilization level of the first type of functional unit based on the performance data, and comparing the utilization level of the first type of functional unit with a first threshold. The method also includes, when a first condition has been satisfied, power gating at least one of the first type of functional unit in the processor. The method may include dynamically loading a specific needs register for each time quantum that a process runs on the processor.

17 Claims, 7 Drawing Sheets

AUTONOMOUS MICROPROCESSOR RE-CONFIGURABILITY VIA POWER GATING PIPELINED EXECUTION UNITS USING DYNAMIC PROFILING

CROSS REFERENCE TO RELATED APPLICATION

This application claims the benefit of U.S. Provisional Application No. 61/595,143, filed on Feb. 5, 2012, which is hereby incorporated by reference in its entirety.

BACKGROUND

Static power dissipation is quickly becoming the main component to the overall power consumption of the modern microprocessor or integrated circuit (IC). As we reduce horizontal feature size of the transistors we also reduce the vertical feature size. Transistors are built by the vertical layering of electrically dissimilar materials with extremely low and precise geometrical tolerances at the atomic scale. Some of the vertical slices are significantly thinner than the horizontal features. The gate oxide layer which separates charge between the gate from the p and n channels of the substrate can be measured by counting atoms of thickness. As this vertical scaling continues beyond 32 nm, the electric polarization field will continue to weaken and thus the gate oxide loses the ability to separate charge. Because of this, electrons have a less restricted flow. This results in increased static power or "leakage power," which is now becoming the dominant power loss as process technology continues to scale. Functional units (FUs) within a pipeline's execution stages account for a large percentage of the microprocessors "on chip" real-estate. The amount of leakage within a given process technology is largely proportional to the number of transistors on the die. As static leakage power dissipation continues to worsen as CMOS scaling continues, technologies that reduce or eliminate leakage power dissipation will be of paramount importance.

From an architectural perspective, the needs of each program running on a general purpose microprocessor are very different, as such high end microprocessors are usually designed to accommodate a broad range of different programs and applications. In many cases this results in an over design which may come in the form of an aggressive super-scalar architecture that may have a large number of FUs. These FUs may be in the idle state for a significant amount of the time where they are incurring static leakage power without the benefit of doing real work.

Most modern microprocessors are equipped with performance monitoring capabilities to provide designers and programmers insight into the performance of a microprocessor during the execution of a process or program. These performance monitoring units can record "event" data for various types of performance events such as the utilization levels of pipelines execution units.

PRIOR ART

U.S. Pat. No. 7,868,479, titled "Power gating for multimedia processing power management," pertains to a power management implementation designed to save power while driving a multimedia display. The method of the '479' patent is implemented using software control and would render a processor useless due to the excessive power up latency.

U.S. Pat. No. 7,868,479, "Power gating various number of resources based on utilization levels," involves the use of programmable logic devices (PLD) such as a FPGA. The technology statically power gates unused general purpose logic blocks within a programmable logic device during the programming phase.

U.S. Pat. No. 7,447,923, titled "Systems and methods for mutually exclusive activation of microprocessor resources to control maximum power" involves monitoring the maximum power threshold to invoke or power gate resources if the maximum power is below or above the specified threshold respectively.

U.S. Pat. No. 7,266,707, titled "Dynamic leakage control circuit," involves power gating stages within a pipeline.

"Predictive Power Gating with Optional Guard Mechanism" involves using an algorithm to predict units to power gate.

SUMMARY

Field of Invention

This invention relates to power gating technology within a microprocessor's pipeline stages. In an embodiment, when one or more functional units, such as, but not limited to, a floating point multiplier or divider has a low or zero utilization level, the one or more functional units may be power gated. The power gating is determined via a hardware process profiling unit that generates a specific need profile value for each process running on the microprocessor in a time multiplexed computing system. The specific needs profile value that holds the power enablement of each FU is loaded into a configuration register at the beginning of each context switch of the operating system for the running process.

A modern high-end microprocessor may have more than a dozen functional units within the execution stages of its pipeline. This plurality of functional units is included to provide an increase in instruction level parallelism during the execution of a program in order to increase the instruction execution throughput. In many cases, depending on the instruction stream of the program, many of these functional units remain in an idle state, in which they incur static leakage power dissipation. As a result, power dissipation in an integrated circuit (IC) or microprocessor may reduce battery life and increase the temperature of the IC, which limits reliability and life of the IC.

In an embodiment, a power gating pipeline control method uses a dynamic process profiler unit 304 which analyzes performance data that is recorded by the performance monitoring unit 302 and compares that data against a user defined list of thresholds. The process profiler unit 304 may be configured to run many different algorithms depending on the performance and power needs of the microprocessors application domain, but in most cases it should be designed to ensure that: 1) If an FU is not being utilized then it will be power gated. 2) If the utilization level of an FU is higher than a threshold then additional FUs will be enabled. 3) The algorithm can detect if other performance limiting events that are not associated with a plurality of available FUs are causing low utilization levels, and can make appropriate adjustments via power gating FUs depending on the needs of the application domain.

This method will eliminate dynamic and static power dissipation associated with unneeded FUs during the execution of a process or program. It allows for tighter coupling between the hardware and software which will allow better performance while using less power.

DETAILED DESCRIPTION

Figure 2:
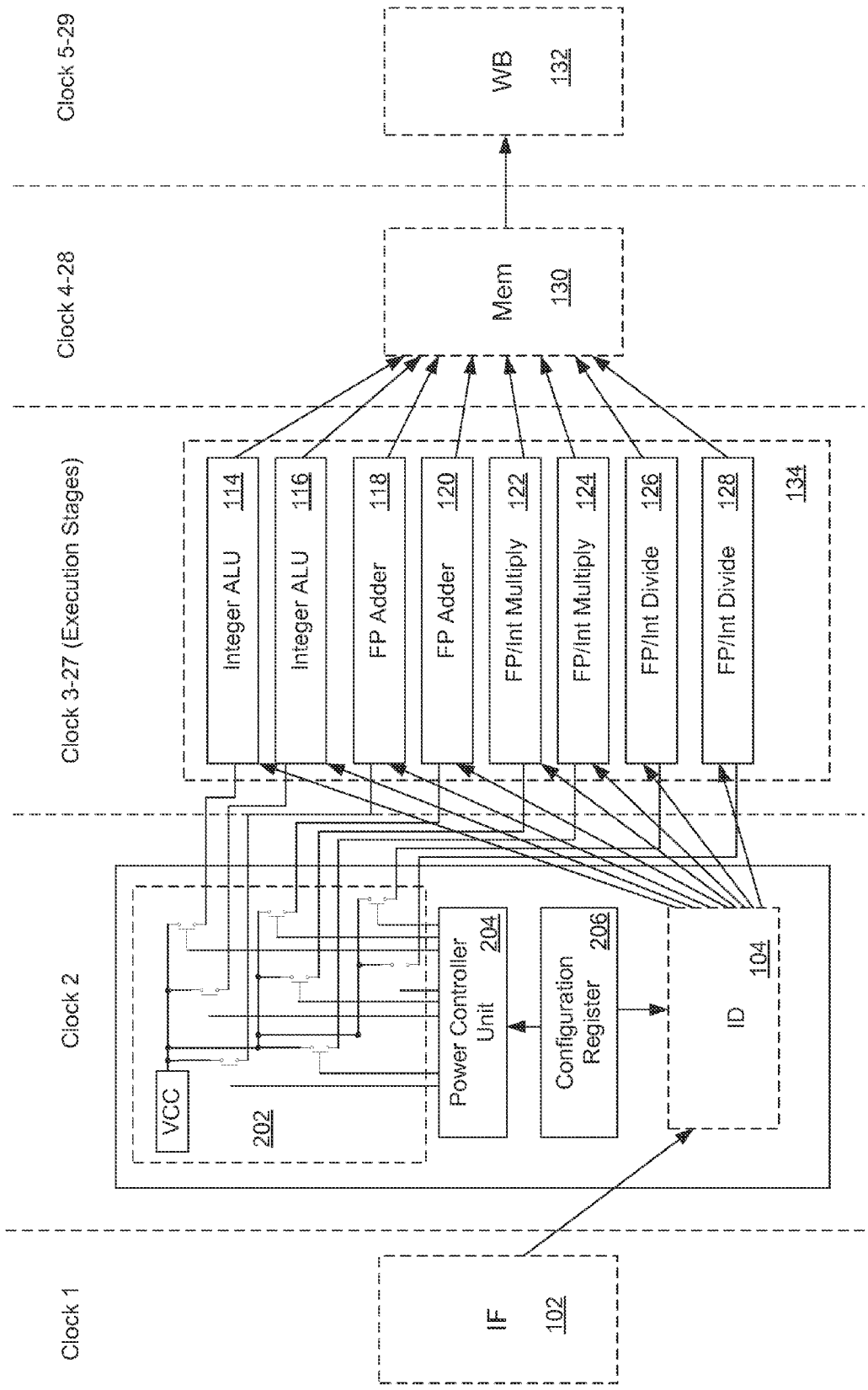
FIG. 2 shows an expansion of the classic five stage pipeline from FIG. 1 with the addition of a power switch network, a power controller unit and a pipeline configuration register to support power gating the FUs of the execution stages, according to an embodiment.
Figure 3:
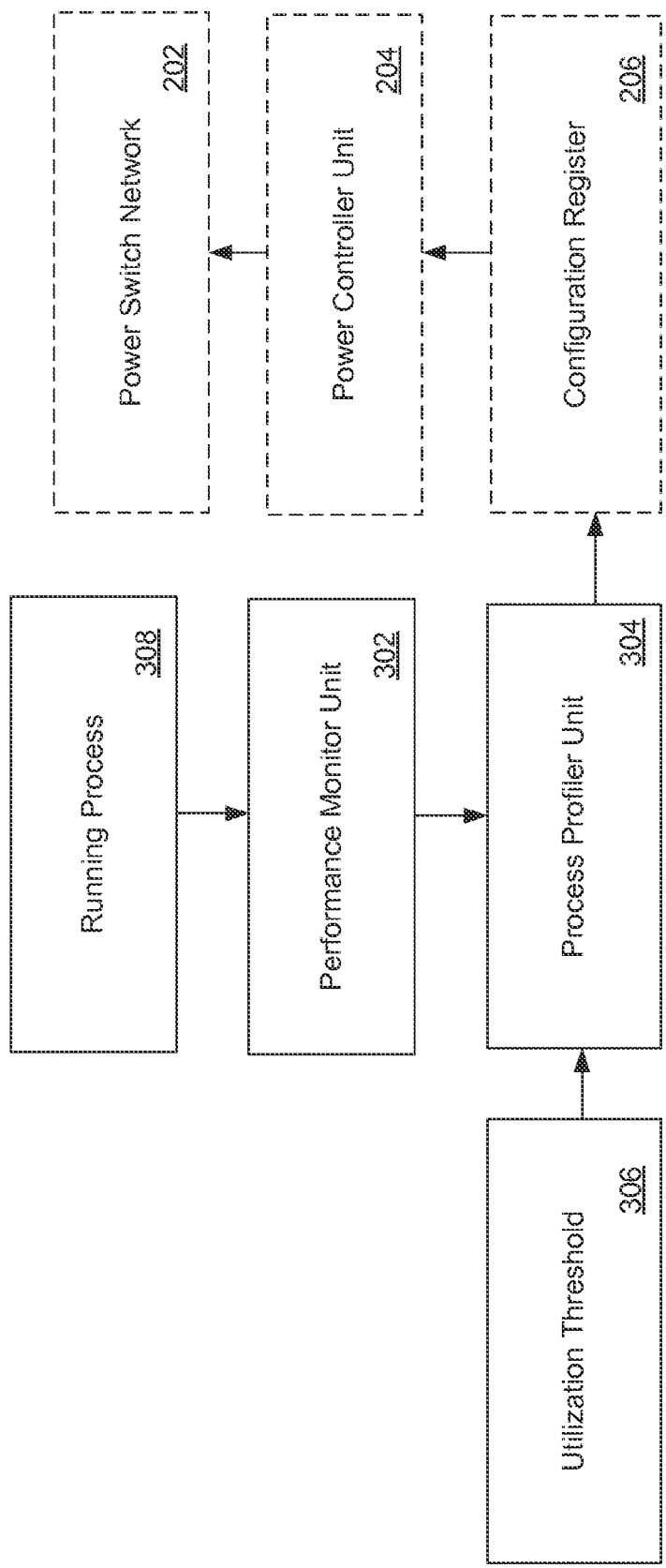
FIG. 3 shows the operational flow and block diagram of the minimum units needed to perform the process profiling and power gating functionality of the proposed invention, according to an embodiment.
Figure 4:
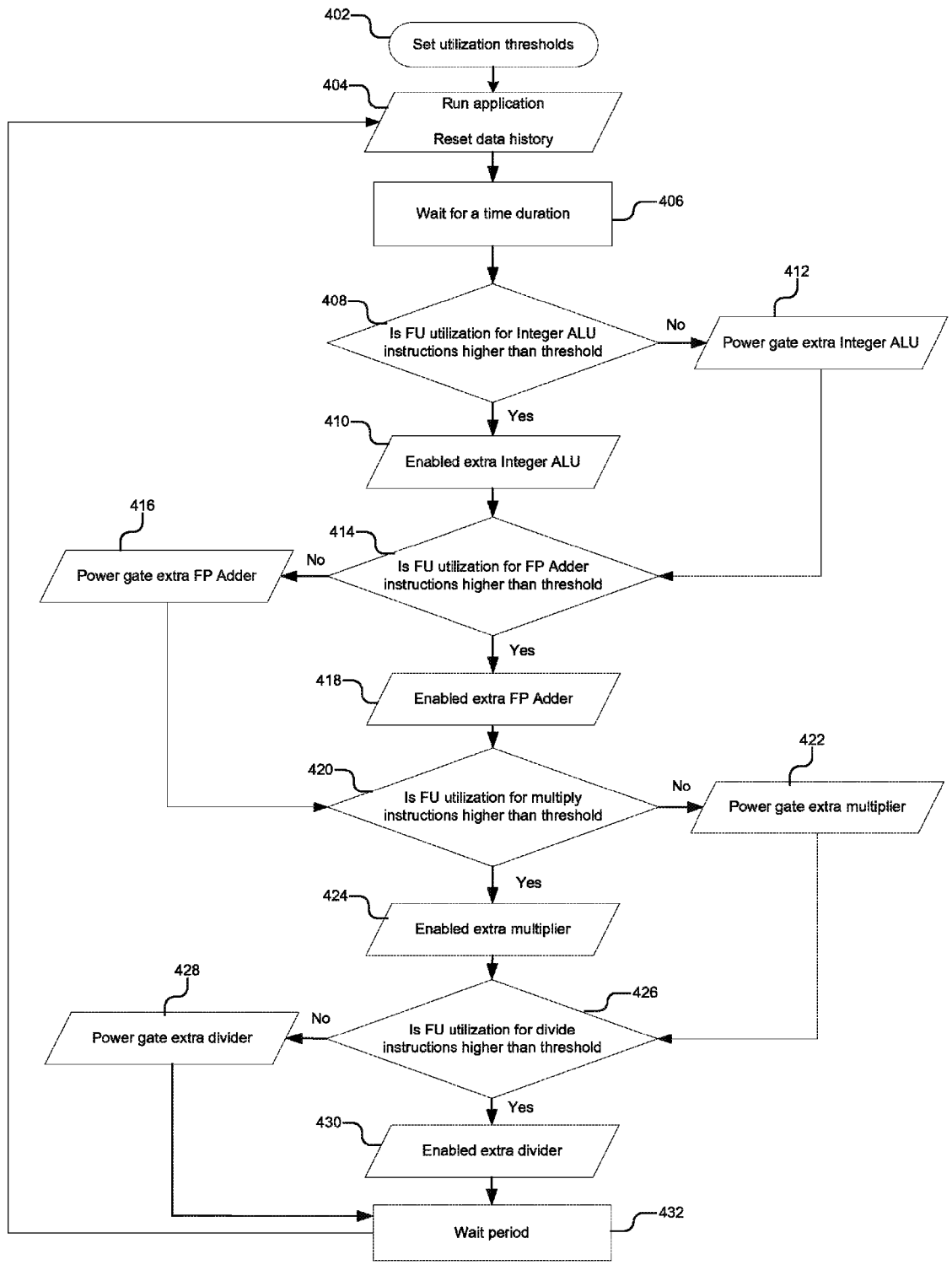
FIG. 4 shows an example of a profiling algorithm that may be implemented in the process profiler unit, according to an embodiment.
Figure 5:
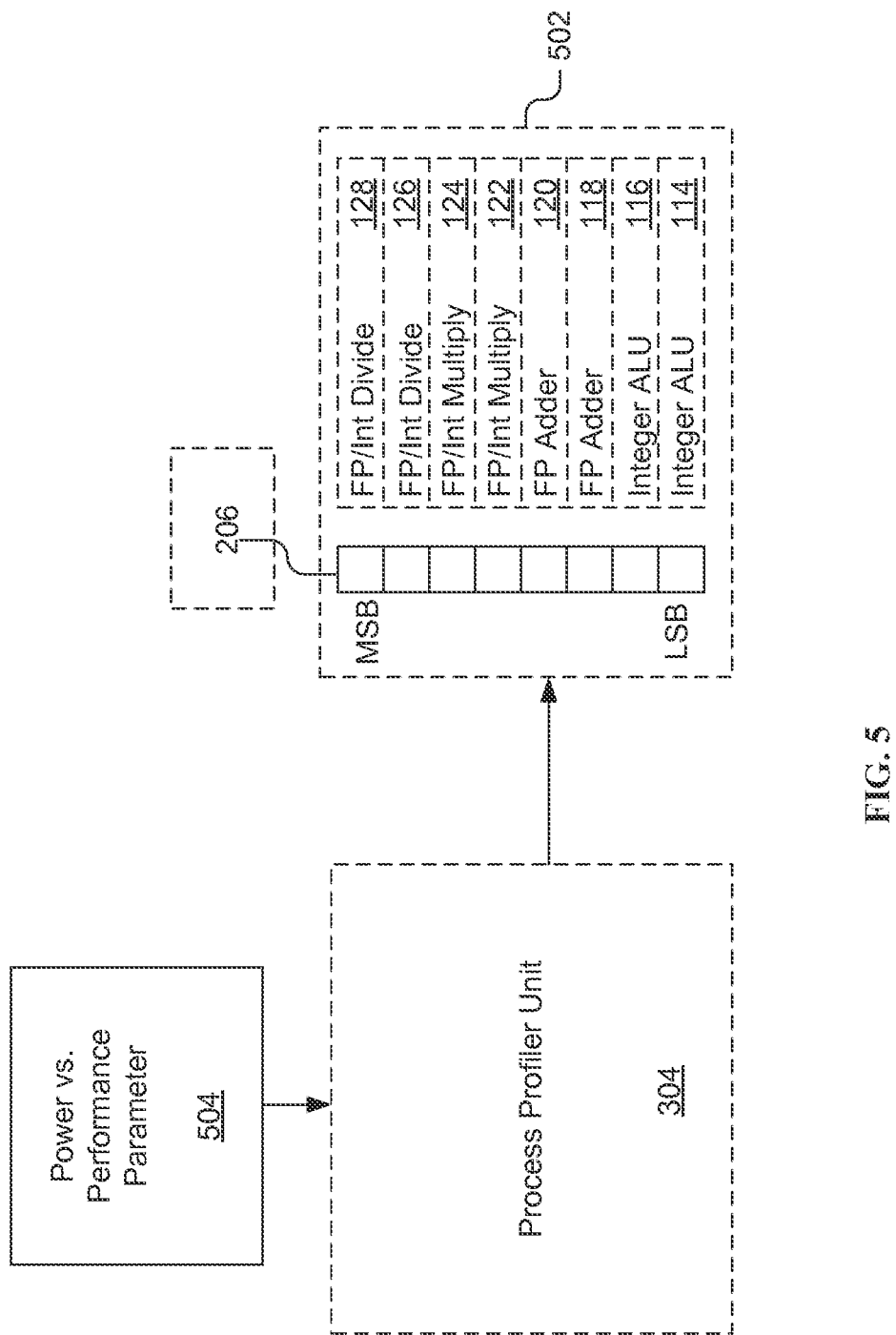
FIG. 5 shows how a power versus performance parameter may be an input into the process profiler unit and the corresponding mapping of configuration bits that may be outputted from the process profiler unit to a configuration register or look up table (LUT), according to an embodiment.

The basic concept of this invention is to use a dynamic process profiler unit 304 which may use an algorithm similar but not limited to the one disclosed in FIG. 4 to monitor the utilization level of an FU, to make intelligent decisions as to when to enable or power gate the plurality of "like" FUs shown in FIG. 2 such as two Integer ALUs 114 and 116, two FP adders 118 and 120, two multipliers 122 and 124, and two dividers 126 and 128.

Figure 1:
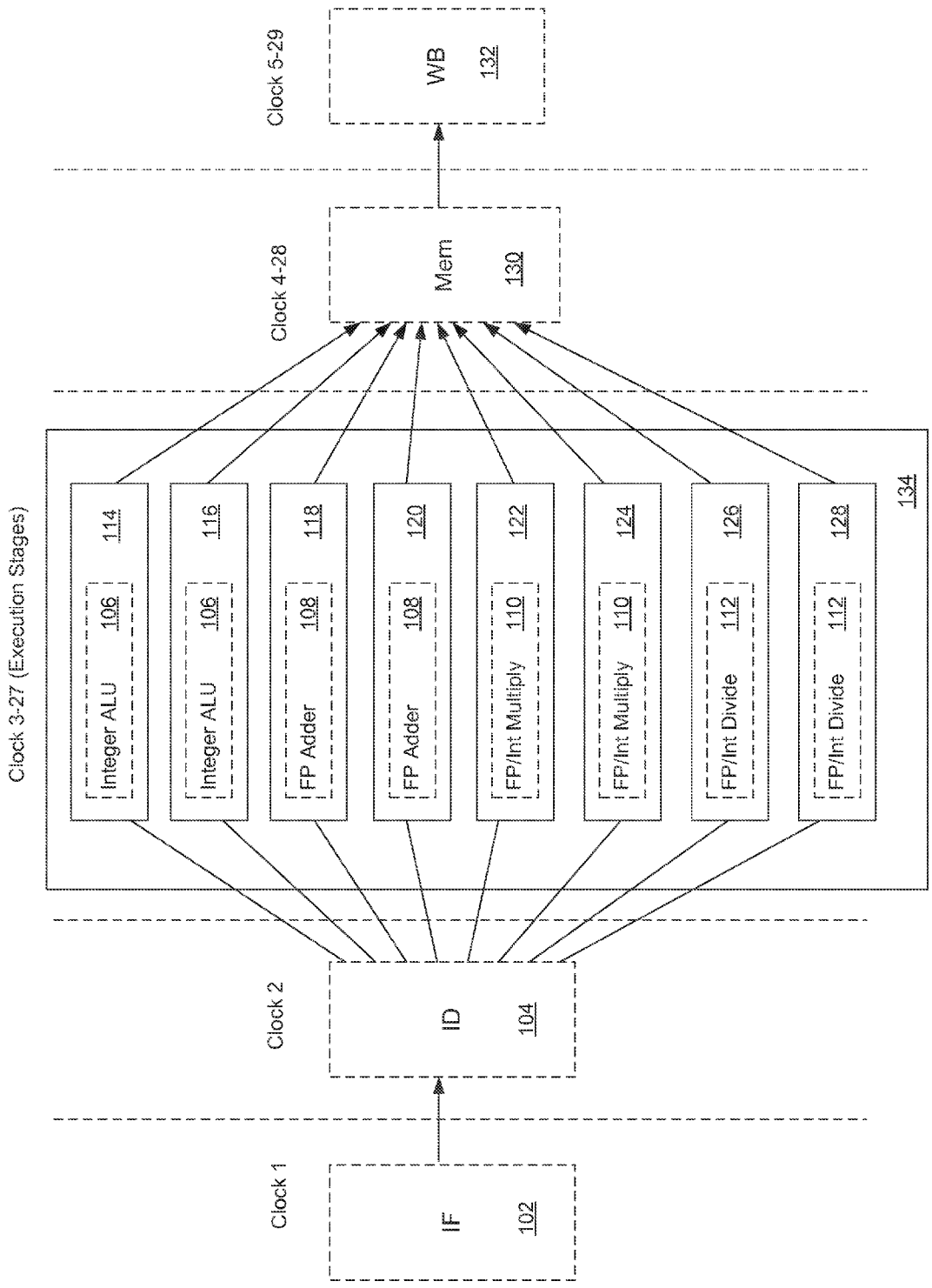
FIG. 1 shows a diagram of the classic five stage pipeline within a microprocessor, with the execution stages configured to do multi-cycle operations, according to an embodiment.

The concept of pipelining was introduced commercially around the 1980's as a way to exploit instruction level parallelism with the execution of a sequential program. Operations to be performed on the instructions are broken down into stages that occur in succession. The instructions enter the pipeline in an assembly line fashion to effectively increase the throughput of completed instructions. FIG. 1 shows a classic five stage pipeline. The first stage of the pipeline is the instruction fetch (IF) stage 102, which among other things the current instruction is fetched from memory. The second stage is the instruction decode (ID) stage 104 where decoding is done in parallel to register reads. The third section of stages is the execution stages (EX) 134, which have been expanded to include FUs that perform multi-cycle operations. The execution stages of the pipeline are the main focus of this disclosure. The fourth stage is a memory access 108 stage which applies to loads and stores and finally the write back stage 110 to registers.

As an instruction stream enters the pipeline that has a plurality of "like" FUs such as 114, 116, 118, 120, 122, 124, 126, and 128 as shown in FIG. 2, event data is recorded by the performance monitor 302 where the process profiling unit 304 analyzes the data to determine the utilization level of a particular functional unit. The process profiling unit 304 then checks the utilization level against a set threshold 306 to determine if there is a need for the extra FUs to be enabled or power gated. These thresholds may be very different depending on the needs of the microprocessors application domain and the running process 308.

The control algorithm of FIG. 4 starts by the user setting the desired utilization thresholds 306 as seen in step 402 and may be programmed at system boot up. Once a program is loaded and running as shown in step 404, the data is analyzed by the process profiling unit 304. It may be reset so that the profiling data represents a processes recent execution history. The algorithm waits for a time period 406 so that a sample of data can be collected for analysis. Once the time period is over and data is available the control algorithm checks the utilization level of the integer ALUs as shown in step 408. If the utilization level is higher than the preset threshold 306 then the control algorithm will enable integer ALU 116 per step 410 via placing a logic '1' in the second bit location next to the least significant bit (LSB) shown in 502. If that bit location already stores logic '1', then the enablement status of ALU 116 will be maintained for at least one more loop of the control algorithm. In contrast, if the utilization level of both integer ALUs 106 is lower than the preset threshold 306, then the control algorithm will power gate integer ALU 116 per step 412 by writing a logic '0' to the second bit location of 502. The same process repeats for FP Adder unit 108 instructions as shown in steps 414, 416, and 418 with the fourth bit location of 502, for multiply unit 110 instructions as shown in steps 420, 422, and 424 with the sixth bit location of 502, and finally for divide unit 112 instructions 426, 428, and 430 with the eighth bit location of 502.

The utilization level may be determined by several different methods depending on the events that are available on an architectures performance monitoring unit 302. For example some existing performance monitoring units can record the number of floating point divide instructions that were issued, executed, retired, and types of stalls that occurred. In addition, they count the number of clock cycles and the number of instructions that are issued. With such data, the relative utilization of the execution FUs 134 may be determined. However, no matter how "utilization" is determined, the control algorithm should ensure that the utilization levels are a function of the utilization of particular FUs and not another type of performance limiting event such as a cache miss which may result in a memory access. During a memory access, the pipeline may stall and the utilization level of the FUs 134 may drop dramatically which may cause the control algorithm to prematurely power gate an FU that is actually needed. In which case the control algorithm may be augmented to power gate FUs if other performance limiting events are causing frequent stalls. This adjustment is highly dependent on the application domain of the microprocessor and may vary significantly depending on the sensitivity of the power versus performance needs.

Once a process 308 is deemed profiled by the design of the algorithm the configuration register 206 is loaded with the fresh profiling data per steps 410 or 412, 416 or 418, 422 or 424, and 428 or 430 where the bit fields LSB to MSB of 502 map to the power controller unit 204 to configure the power switch network 202 that controls the power status of the FUs in 134. The instruction decoder 104 also reads the configuration register 206 to insure that it will not issue instructions to a FU that is currently power gated.

A power versus performance parameter 504 may be introduce to the control algorithm to further adjust the sensitivity of the bits in the configuration register depending on the performance versus power needs of the application domain. For example if a process 308 is running on a cell phone that is powered by a battery, the input parameter may be set to favor power over performance. In which case, the process profiler unit 304 may not enable all the available FUs even if utilization levels are higher than the threshold 306 as a means to save power.

This invention could be expanded to allow a finer grained implementation where the process profile 502 is stored in a look up table (LUT) either in a on chip location such as a TLB entry or in external memory to be loaded in the configuration register 206 as part of a context switch. This will help eliminate the startup penalty in terms of time and power, associated with profiling each process 308 during each context switch as the process will start each "time quantum" with the balanced architecture that was profiled for the same processes during its last time quantum. It may be useful to periodically profile the hardware needs of the running process to assess any possible changing needs.

In addition, it may be desirable to include non-pipelined FUs in the execution stages 134 of the pipeline as the transistor count is significantly lower than a pipelined FU. This would enable functional support for a relatively rare instruction in a process 308. For example if the divider unit 112 has a very low utilization level, then it may make more sense to have a non-pipelined divider unit as the leakage associated with it will be dramatically lower.

Figure 6:
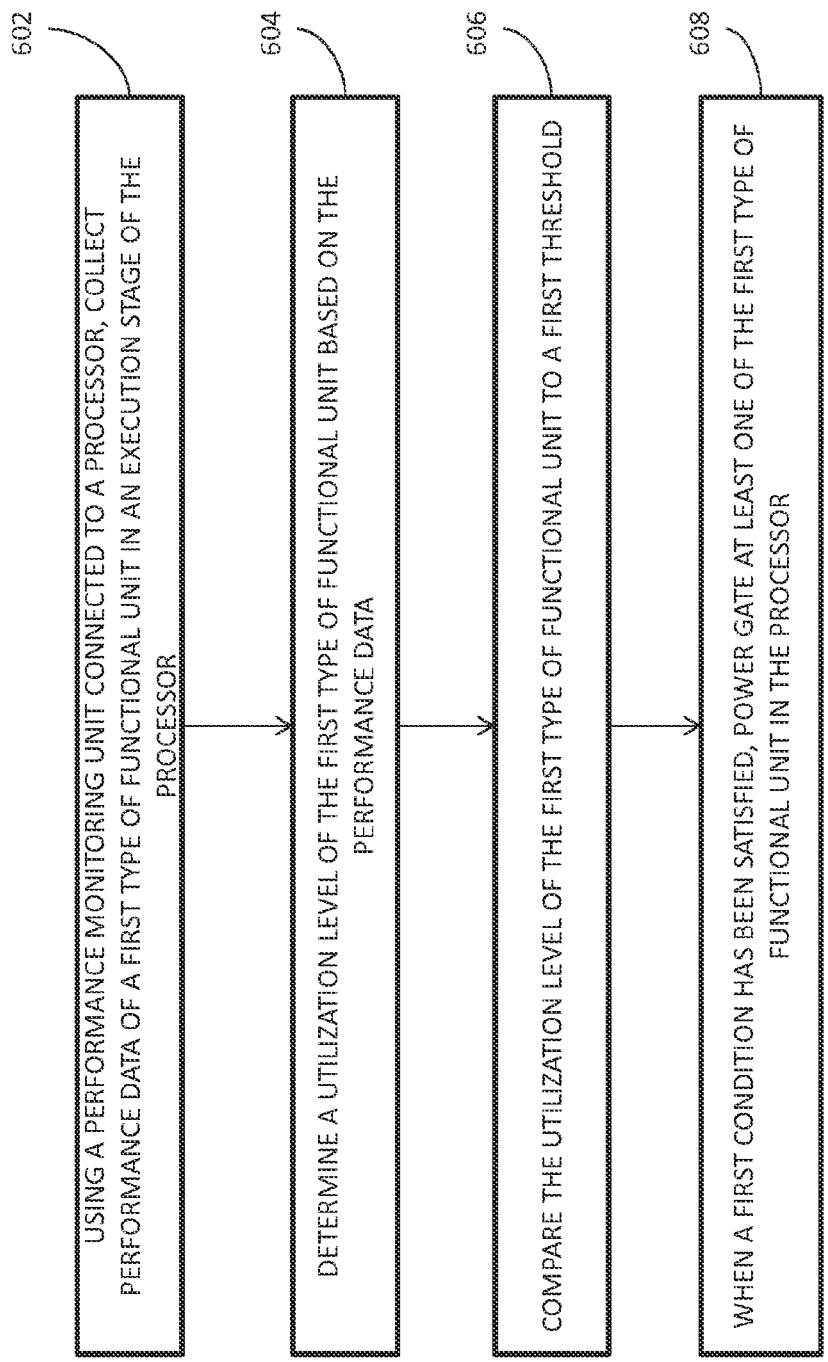
FIG. 6 is a process flow for controlling functional units of a processor, according to an embodiment.

FIG. 6 is a process flow for controlling functional units of a processor, according to an embodiment. In operation 602, a performance monitoring unit connected to a processor is used to collect performance data of a first type of functional unit in an execution stage of the processor. The performance monitoring unit may be composed of circuitry configured to collect performance data. In operation 604, a utilization level of the first type of functional unit is determined based on the performance data. For example, the performance data may include the number of floating point divide instructions that were issued, executed, retired, and types of stalls that occurred. In operation 606, the utilization level of the first type of functional unit is compared with a first threshold, which may be predetermined. In operation 608, at least one of the first type of functional unit in the processor is power gated when a first condition has been satisfied. For example, all integer ALU functional units may be power gated while they are unneeded, while the floating point multiplication functional units remain powered and available for operation in the execution stage of the processor.

Figure 7:
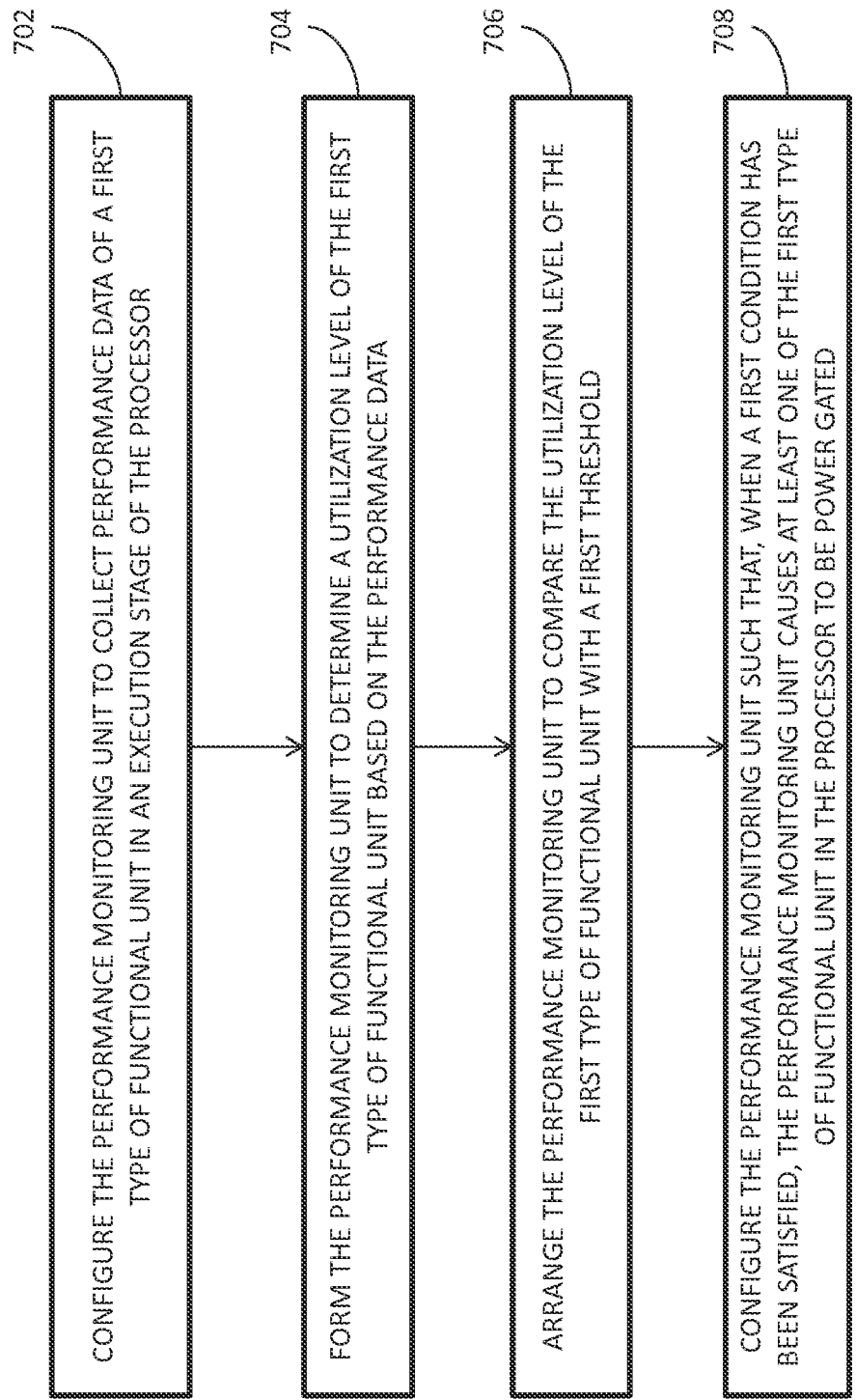
FIG. 7 is a process flow for configuring a performance monitoring unit to control functional units of a processor, according to an embodiment.

FIG. 7 is a process flow for configuring a performance monitoring unit to control functional units of a processor, according to an embodiment. In operation 702, the performance monitoring unit is configured to collect performance data of a first type of functional unit in an execution stage of the processor. In operation 704, the performance monitoring unit is formed to determine a utilization level of the first type of functional unit based on the performance data. In operation 706, the performance monitoring unit is arranged to compare the utilization level of the first type of functional unit with a first threshold. In operation 708, the performance monitoring unit is configured such that, when a first condition has been satisfied, the performance monitoring unit causes at least one of the first type of functional unit in the processor to be power gated.

In an embodiment, a functional unit control method includes using a performance monitoring unit connected to a processor, collecting performance data of a first type of functional unit in an execution stage of the processor. The method further includes determining a utilization level of the first type of functional unit based on the performance data, and comparing the utilization level of the first type of functional unit with a first threshold. The method also includes, when a first condition has been satisfied, power gating at least one of the first type of functional unit in the processor.

The first condition may be satisfied when the utilization level has been determined to be below the first threshold. In another embodiment, the first condition may be satisfied when the utilization level has been determined to be below the first threshold, and a performance parameter is set to prioritize energy saving relative to performance of the processor.

The functional unit control method may further include comparing the utilization level of the first type of functional unit to a second threshold, and when the second condition has been satisfied, enabling at least one of the first type of functional unit. In some embodiments, the first threshold and the second threshold may be the same threshold. The second condition may be satisfied when the utilization level has been determined to be above the second threshold. In other embodiments, the second condition may be satisfied when the utilization level has been determined to be above the second threshold, and a performance parameter is set to prioritize performance of the processor relative to energy saving.

In some embodiments, the first functional unit is one of an integer ALU, a floating point adder, a floating point multiplier, and a floating point divider. The method may further include updating a configuration register that controls a switch governing power provided to the first functional unit. The method may also include updating a lookup-table, wherein the configuration register is updated using information from the lookup-table during a context switch to limit a startup time of the processor. The method may further include accessing the configuration register, and based on the configuration register, determining whether to allocate an instruction to the first functional unit.

In another embodiment, a system for controlling at least one functional unit includes a performance monitoring unit connected to a processor having a first type of functional unit in an execution stage. The performance monitoring unit is configured to collect performance data of the first type of functional unit in an execution stage of the processor, to determine a utilization level of the first type of functional unit based on the performance data, and to compare the utilization level of the first type of functional unit with a first threshold. When the first condition has been satisfied, the performance monitoring may be configured to power gate at least one of the first type of functional unit in the processor.

The first condition may be satisfied when the utilization level has been determined to be below the first threshold. In another embodiment, the first condition is satisfied when the utilization level has been determined to be below the first threshold, and a performance parameter is set to prioritize energy saving relative to performance of the processor.

The performance monitoring unit may further be configured to compare the utilization level of the first type of functional unit to a second threshold, and when the second condition has been satisfied, to enable at least one of the first type of functional unit.

The first threshold and the second threshold may be the same threshold. In some embodiments, the second condition is satisfied when the utilization level has been determined to be above the second threshold. In other embodiments, the second condition may be satisfied when the utilization level has been determined to be above the second threshold, and a performance parameter is set to prioritize performance of the processor relative to energy saving.

In an embodiment, a method of forming a performance monitoring unit to control at least one functional unit of a processor includes configuring the performance monitoring unit to collect performance data of a first type of functional unit in an execution stage of the processor. The method further includes forming the performance monitoring unit to determine a utilization level of the first type of functional unit based on the performance data, and arranging the performance monitoring unit to compare the utilization level of the first type of functional unit with a first threshold. The method further includes configuring the performance monitoring unit such that, when a first condition has been satisfied, the performance monitoring unit causes at least one of the first type of functional unit in the processor to be power gated. The first condition may be satisfied when the utilization level has been determined to be below the first threshold.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A functional unit control method comprising:
    using a performance monitoring unit connected to a processor, collecting performance data of a first type of functional unit in an execution stage of the processor's pipeline;
    determining a utilization level of the first type of functional unit based on the performance data;
    comparing the utilization level of the first type of functional unit with a first threshold;
    when a first condition has been satisfied, power gating at least one of the first type of functional unit in the processor;
    updating a configuration register that controls a switch governing power provided to the first functional unit;
    updating a lookup-table disposed in at least one of off-chip and on-chip memory, wherein the configuration register is updated using information from the look-up table during the context switch to limit a startup time required to profile a current process running on the processor; and,
    wherein the lookup-table stores specific needs values for a plurality of processes after each has been profiled to permit reuse of the specific needs values for corresponding processes during each context switch of the processor.

2. The functional unit control method of claim 1, wherein the execution stage of the processor pipeline includes a first class and a second class of the first type of functional unit, wherein the first class is pipelined, and the second class is non-pipelined.

3. The functional unit control method of claim 1, wherein the first condition is satisfied when the utilization level has been determined to be below the first threshold.

4. The functional unit control method of claim 1, wherein the first condition is satisfied when the utilization level has been determined to be below the first threshold, and a performance parameter is set to prioritize energy saving relative to performance of the processor.

5. The functional unit control method of claim 4, wherein the parameter is set by at least one of a software algorithm and a hardware condition.

6. The functional unit control method of claim 5, wherein the hardware condition is a connection of a device to a battery charger.

7. The functional unit control method of claim 1, further comprising
    comparing the utilization level of the first type of functional unit to a second threshold; and
    when a second condition has been satisfied, enabling at least one of the first type of functional unit.

8. The functional unit control method of claim 7, wherein the first threshold and the second threshold are the same threshold.

9. The functional unit control method of claim 7, wherein the second condition is satisfied when the utilization level has been determined to be above the second threshold.

10. The functional unit control method of claim 7, wherein the second condition is satisfied when the utilization level has been determined to be above the second threshold, and a performance parameter is set to prioritize performance of the processor relative to energy saving.

11. The functional unit control method of claim 1, wherein the first functional unit is one of an integer unit, a floating point adder, a floating point multiplier, a floating point divider, a load unit, a store unit, and a branch unit.

12. The functional unit control method of claim 1, further comprising:
    accessing the configuration register; and
    based on the configuration register, determining whether to allocate an instruction to the first functional unit.

13. The functional unit control method of claim 1, further comprising:
    pausing the process of collecting profiling data while the processor is stalled due to a performance limiting event.

14. The functional unit control method of claim 1, further comprising:
    power gating at least one of a second type of functional unit in the processor based on a frequency of stalls that occurred in the processor.

15. A system for controlling at least one functional unit, the system Controlling:
    a performance monitoring unit connected to a processor having a first type of functional unit in an execution stage, the performance monitoring unit being configured to:
        a. collect performance data of the first type of functional unit in an execution stage of the processor;
        b. determine a utilization level of the first type of functional unit based on the performance data;
        c. compare the utilization level of the first type of functional unit with a first threshold, and when the first condition has been satisfied, to power gate at least one of the first type of functional unit in the processor;
        d. update a configuration register that controls a switch governing power provided to the first functional unit;
        e. update a lookup-table disposed in at least one of off-chip and on-chip memory, wherein the configuration register is updated using information from the look-up table during the context switch to limit a startup time required to profile a current process running on the processor; and,
        f. wherein the lookup-table stores specific needs values for a plurality of processes after each has been profiled to permit reuse of the specific needs values for corresponding processes during each context switch of the processor.

16. The system of claim 15, wherein the first condition is satisfied when the utilization level has been determined to be below the first threshold.

17. A method of forming a performance monitoring unit to control a least one functional unit of a processor, the method comprising:
- configuring the performance monitoring unit to collect performance data of a first type of functional unit in an execution stage of the processor;
- forming the performance monitoring unit to determine a utilization level of the first type of functional unit based on the performance data;
- arranging the performance monitoring unit to compare the utilization level of the first type of functional unit with a first threshold;
- configuring the performance monitoring unit such that, when a first condition has been satisfied, the performance monitoring unit causes at least one of the first type of functional unit in the processor to be power gated;
- updating a configuration register that controls a switch governing power provided to the first functional unit;
- updating a lookup-table disposed in at least one of off-chip and on-chip memory, wherein the configuration register is updated using information from the look-up table during the context switch to limit a startup time required to profile a current process running on the processor; and,
- wherein the lookup-table stores specific needs values for a plurality of processes after each has been profiled to permit reuse of the specific needs values for corresponding processes during each context switch of the processor.

* * * * *